W. E. BROWNING.
ICE MAKING MACHINE.
APPLICATION FILED MAY 21, 1914.

1,166,966.

Patented Jan. 4, 1916.

WITNESSES.
S. C. McBride
G. C. Denny

INVENTOR.
William E. Browning
by Foster Furman Watson
Atty

UNITED STATES PATENT OFFICE.

WILLIAM EDWARD BROWNING, OF LONDON, ENGLAND, ASSIGNOR TO HAMPDENS LIMITED, OF LONDON, ENGLAND.

ICE-MAKING MACHINE.

1,166,966.    Specification of Letters Patent.    Patented Jan. 4, 1916.

Application filed May 21, 1914. Serial No. 840,117.

*To all whom it may concern:*

Be it known that I, WILLIAM EDWARD BROWNING, subject of the King of England, residing at London, in England, have invented certain new and useful Improvements in Ice-Making Machines, of which the following is a specification.

This invention relates to machines for making ice of the kind in which an annular mold is immersed in a freezing mixture which is agitated by rotary paddles or the like.

The object of this invention is to provide a portable machine of this type especially adapted to domestic use which will rapidly produce solid ice and from which the ice, when made, can readily be removed.

According to this invention the apparatus comprises an outer casing or tub preferably of insulating material adapted to contain a freezing mixture and having removably supported within it an annular mold, the relative dimensions of the casing and mold being such that spaces are provided for the freezing mixture between the outer wall of the mold and the casing and within a central chamber with which the mold is provided.

Paddles operatively connected to a rotatable shaft are provided to agitate simultaneously the freezing mixture within the central chamber and around the mold, the freezing mixture in contact with the inner and outer walls of the mold being thus simultaneously agitated.

The mold comprises separable inner and outer walls the annular base of the mold being either rigidly secured to one of such walls or removably connected to both these walls. The arrangement is such that when the liquid contained in the mold has been converted into ice the mold is removed from the tub and the outer wall of the mold is then withdrawn or separated from the inner wall around which the ice is formed. All the ice can then readily be removed from the mold and the component parts of the latter can be readily cleaned or dried prior to the machine being used again. Preferably means are provided to lock the two parts of the mold against unintentional separation, for instance a bayonet joint may serve to prevent unintentional separation of the inner and outer walls of the mold or a flanged annular base member may screw on to the lower ends of both the inner and outer walls of the mold.

Figure 1:
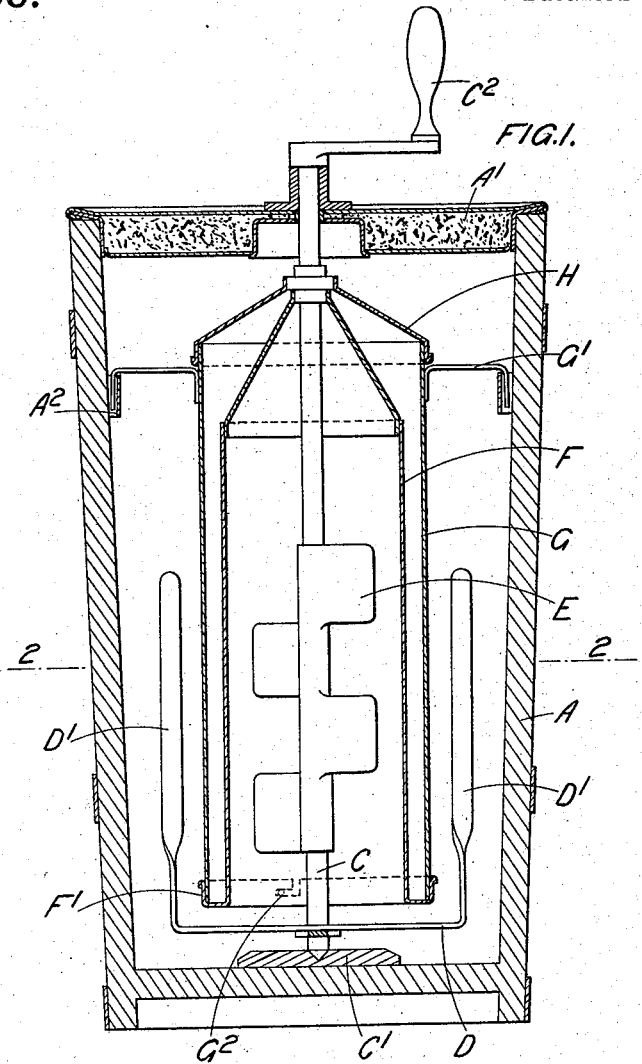
Figure 2:
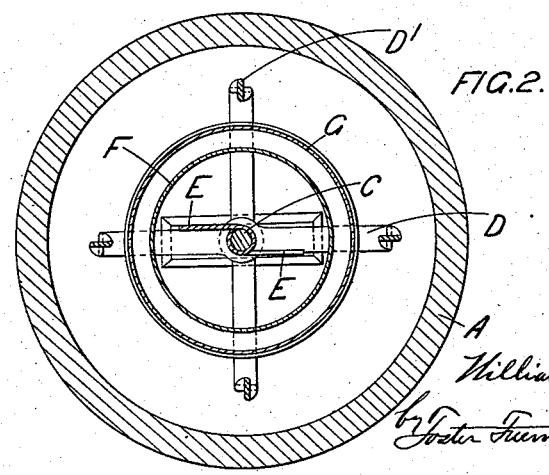

In the accompanying drawing which shows one form of machine according to this invention, Figure 1 is a central vertical section through the machine, and Fig. 2 is a cross-section on the line 2—2 of Fig. 1.

In the construction illustrated the machine comprises an insulated outer casing in the form of a wooden tub or vat A provided with a removable cover A' which also contains or is formed of insulating material. In the base of the tub is formed a bearing C' for a central spindle C the outer end of which projects through a central aperture in the cover A' and is provided with an operating handle $C^2$ or with a pulley gear wheel or other means whereby the central spindle may be rotated.

Radiating from the lower end of the shaft C are four arms D the outer ends of which extend upward and constitute stirring blades or paddles D' and secured to the spindle C and extending along the lower half thereof are a series of alternating blades or paddles E.

Mounted within the tub A is an annular mold comprising an inner wall F and an outer wall G. The mold is supported in any suitable manner for instance arms G' secured to the outer wall engage brackets or staples $A^2$ connected to the inner wall of the tub. The mold has a removable cover H and an opening is formed in the center of this cover and in the upper end of the inner wall F within which the central shaft C can freely revolve.

In the construction illustrated the inner wall of the mold is provided with an integral flanged annular base F' which embraces the lower end of the outer cylindrical wall G to which it is connected by means of a bayonet joint indicated at $G^2$. Alternatively the flanged base may be carried by the outer wall while yet again an entirely separable base member of U-cross-section may engage in any suitable manner both inner and outer walls F and G.

In operation the tub is filled with a freezing mixture of any known kind for example a mixture of water and nitrate of ammonia or the like. The central spindle C and the stirring members D' it carries are then introduced and the mold F G containing the liquid it is desired to freeze is introduced. The cover H of the mold is then applied, the insulated cover A' of the tub fixed in place and the operating handle C² connected to the outer end of the shaft. The level of the freezing mixture is preferably slightly above that of the liquid contained in the mold but not as high as the cover H to prevent any of the freezing mixture finding its way into the mold through the cover. Owing to the large surfaces of the mold which are in contact with the freezing mixture and by reason of the stirring or agitating members simultaneously bringing about an agitation of the freezing mixture in contact with the inner and outer walls of the mold the contents of the latter are rapidly converted into ice. The handle C² and cover A' are then removed whereupon the entire mold is withdrawn and after the bayonet joint or other locking member has been disconnected at the base of the mold the outer wall G is separated from the inner wall F. The ice which has been made within the mold can then be readily removed from the cylindrical surface on which it is supported and when so removed the component parts of the mold can rapidly be dried or cleaned prior to the machine being stored away or again put into operation.

It will be appreciated that although the container for the freezing mixture has been above described as being in the form of a wooden tub if desired any other insulated vessel may be provided while further the particular construction of the agitating members and the method in which the mold is supported within the tub may be varied without departing from this invention.

What I claim as my invention and desire to secure by Letters Patent is:—

1. In a machine for making ice, the combination of a casing, an annular mold having a central chamber removably supported within the casing, and comprising separable inner and outer walls, the casing and mold being of such relative dimensions that spaces are provided for a freezing mixture within the central chamber of the mold and between its outer wall and the casing, a rotatable shaft mounted centrally within the casing, and paddles operatively connected to said shaft and contained in each of the spaces for the freezing mixture.

2. In a machine for making ice, the combination of a casing, an annular mold having a central chamber removably supported within the casing and comprising separable inner and outer walls, means for locking said walls against unintentional separation, the casing and mold being of such relative dimensions that spaces are provided for a freezing mixture within the central chamber of the mold and between its outer wall and the casing, a rotatable shaft mounted centrally within the casing and paddles operatively connected to said shaft and contained in each of the spaces for the freezing mixture.

3. In a machine for making ice, the combination of a casing having a space for a freezing mixture, an annular mold having a central chamber and comprising separable inner and outer walls, supporting arms mounted on said outer wall, brackets connected to the inner wall of the casing engaged by the outer ends of said arms, the casing and mold being of such relative dimensions that spaces are provided for a freezing mixture around the mold and within its central chamber, a rotatable shaft mounted centrally within the casing and paddles operatively connected to said shaft and contained in each of the spaces for the freezing mixture.

4. In a machine for making ice, the combination of a casing, having a space for a freezing mixture, an annular mold having a central chamber and comprising separable inner and outer walls, arms mounted on said outer wall, brackets secured to the inner wall of the casing engaged by said arms, a flanged base carried by the inner wall of the mold and adapted to embrace the lower end of the outer wall, means for locking the said base and outer wall against unintentional separation and means for agitating a freezing mixture within the casing.

5. In a machine for making ice, the combination of an insulated casing adapted to contain a freezing mixture, an insulated cover for said casing, an annular mold having a central chamber for the freezing mixture and comprising separable inner and outer walls, means for locking said walls against unintentional separation, arms carried by the outer wall of the mold, brackets secured to the inner wall of the insulated casing engaged by said arms, the casing and mold being of such relative dimensions that an annular space is provided for a freezing mixture around the mold, a central shaft extending through the cover and rotatably mounted within the casing, stirring arms radiating from the lower end of said shaft adapted to agitate the freezing mixture in the annular space around the mold, paddles mounted on the shaft adapted to agitate the freezing mixture within the central chamber of the mold and means outside the casing for simultaneously rotating the stirring arms and paddles.

In testimony whereof I have signed my name to this specification in the presence of two subscribing witnesses.

WILLIAM EDWARD BROWNING.

Witnesses:
FREDERICK ADOLPH SCHWABACHER,
ROBERT GODDARD.